United States Patent
Hashimoto et al.

(10) Patent No.: US 10,414,287 B2
(45) Date of Patent: *Sep. 17, 2019

(54) CONTROL APPARATUS FOR ROTARY ELECTRIC MACHINES

(71) Applicants: DENSO CORPORATION, Kariya, Aichi-pref. (JP); NISSAN MOTOR CO., LTD., Yokohama-shi, Kanagawa (JP)

(72) Inventors: Syo Hashimoto, Kariya (JP); Shuichi Orita, Atsugi (JP)

(73) Assignees: DENSO CORPORATION, Kariya (JP); NISSAN MOTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/501,557

(22) PCT Filed: Aug. 6, 2015

(86) PCT No.: PCT/JP2015/072408
§ 371 (c)(1),
(2) Date: Feb. 3, 2017

(87) PCT Pub. No.: WO2016/021696
PCT Pub. Date: Feb. 11, 2016

(65) Prior Publication Data
US 2017/0217332 A1   Aug. 3, 2017

(30) Foreign Application Priority Data

Aug. 6, 2014  (JP) ................................. 2014-160087

(51) Int. Cl.
*B60L 15/20* (2006.01)
*H02P 29/00* (2016.01)
(Continued)

(52) U.S. Cl.
CPC ............. *B60L 15/20* (2013.01); *B60L 50/51* (2019.02); *H02P 23/04* (2013.01); *H02P 27/06* (2013.01);
(Continued)

(58) Field of Classification Search
CPC .. B60L 3/0061; B60L 15/20; B60L 2240/423; H02P 27/06; H02P 29/028
See application file for complete search history.

(56) References Cited

U.S. PATENT DOCUMENTS

| 2012/0081051 | A1 | 4/2012 | Kobayashi et al. |
| 2013/0173108 | A1* | 7/2013 | Hashimoto ............ B60K 6/445 701/22 |
| 2017/0120752 | A1* | 5/2017 | Osamura ............... B60L 3/0061 |

FOREIGN PATENT DOCUMENTS

| JP | 2010-200587 A | 9/2010 |
| JP | 2013-090434 A | 5/2013 |

(Continued)

OTHER PUBLICATIONS

Oct. 27, 2015 International Search Report issued in International Patent Application No. PCT/JP2015/072408.

*Primary Examiner* — Genna M Mott
(74) *Attorney, Agent, or Firm* — Oliff PLC

(57) ABSTRACT

A control apparatus for a rotary electric machine extracts, based on a rotational speed of a rotating member, a vibration component included in the rotational speed of the rotating member, the vibration component being based on vibrations of a drivetrain. The control apparatus calculates, according to the extracted vibration component, compensation torque for compensating the vibrations of the drivetrain. The control apparatus performs drive control of the rotary electric machine according to the compensation torque. The control apparatus performs suppression to suppress the rotational
(Continued)

speed of the rotating member from changing due to change of a speed change ratio.

10 Claims, 4 Drawing Sheets

(51) Int. Cl.
*H02P 27/06* (2006.01)
*H02P 29/028* (2016.01)
*H02P 23/04* (2006.01)
*B60L 50/51* (2019.01)
*H02P 29/032* (2016.01)

(52) U.S. Cl.
CPC ............ *H02P 29/00* (2013.01); *H02P 29/028* (2013.01); *H02P 29/032* (2016.02); *B60L 2240/421* (2013.01); *B60L 2240/423* (2013.01); *B60L 2240/486* (2013.01); *B60L 2270/145* (2013.01); *Y02T 10/644* (2013.01); *Y02T 10/645* (2013.01); *Y02T 10/7005* (2013.01); *Y02T 10/72* (2013.01); *Y02T 10/7275* (2013.01)

(56) References Cited

FOREIGN PATENT DOCUMENTS

| | | |
|---|---|---|
| JP | 2015-089735 A | 5/2015 |
| JP | 2016-039661 A | 3/2016 |
| JP | 2016-046904 A | 4/2016 |

\* cited by examiner

CONTROL APPARATUS FOR ROTARY ELECTRIC MACHINES

TECHNICAL FIELD

The present invention relates to control apparatuses for a rotary electric machine that supplies power to a driving wheel of a vehicle via a driving system having a function of controlling a speed change ratio.

BACKGROUND

Such a control apparatus is known in patent document 1 described later; the control apparatus reduces vibrations of the drivetrain.

Specifically, the control apparatus, which is installed in a vehicle, extracts a resonance frequency component of the drivetrain of the vehicle based on measured values of the electrical angle of a motor as the rotary electric machine. Then, the control apparatus calculates, based on the extracted resonance frequency component, compensation torque to reduce the resonance frequency component. The control apparatus corrects target torque for the motor using the compensation torque, and performs drive control of the motor according to the corrected target torque, thus reducing vibrations of the drivetrain.

CITATION LIST

Patent Document

[Patent Document 1] Japanese Patent Application Publication No. 2013-90434

SUMMARY

Technical Problem

Let us consider that the above control apparatus is applied to a vehicle equipped with a drivetrain including a transmission that includes a first shaft coupled to the output shaft of a motor, and a second shaft coupled to driving wheels of the vehicle. In this vehicle, changing the speed change ratio of the transmission may cause the measured values of the electrical angle of the motor to change, resulting in vibration components, which vibrate with the same frequency as the resonance frequency component of the vehicle, being contained in the measured values of the electrical angle.

This case may cause the compensation torque, which is calculated by the control apparatus for cancelling out the vibrations of the drivetrain, to excessively increase despite actual small vibrations of the drivetrain. This may result in the vehicle being subject to shock based on the excessively increased output torque although the control apparatus performs vibration control.

The present invention has a main object to provide control apparatuses for rotary electric machines; each of the control apparatuses is capable of preventing compensation torque for reducing vibrations generated from a drivetrain from excessively increasing.

Means for Solving Problem

The following describes means for solving the problem, and the operations and achieved effects of the means.

One aspect of the present invention is a control apparatus for a rotary electric machine that is applicable to a vehicle. The vehicle is equipped with a drivetrain that includes a transmission for transmitting power output from rotation of a rotating member of the rotary electric machine to a driving wheel according to a variable speed change ratio. The control apparatus includes an extractor that extracts, based on a rotational speed of the rotating member, a vibration component included in the rotational speed of the rotating member. The vibration component is based on vibrations of the drivetrain. The control apparatus includes a compensation torque calculator that calculates, according to the vibration component extracted by the extractor, compensation torque for counteracting the vibrations of the drivetrain. The control apparatus includes a controller that performs drive control of the rotary electric machine according to the compensation torque. The control apparatus includes a suppressor that performs suppression to suppress the rotational speed of the rotating member from changing due to change of the speed change ratio.

Vibrations of the drivetrain cause the rotational speed of the rotating member to contain a vibration component based on the vibrations of the drivetrain. The one aspect of the present invention extracts, based on the rotational speed of the rotating member, the vibration component, and calculates, according to the extracted vibration component, compensation torque for compensating the vibrations of the drivetrain. The one aspect of the present invention performs suppression to suppress the rotational speed of the rotating member from changing due to change of the speed change ratio. Even if an actual rotational speed of the rotating member changes due to change of the speed change ratio, this suppression suppresses the rotational speed of the rotating member used for extraction of the vibration component from changing due to change of the speed change ratio. This suppression therefore reduces vibration components; these vibration components are contained in the rotational speed of the rotating member, and vibrate at frequencies identical to a frequency of the vibration component caused by the vibrations of the drivetrain. This therefore avoids the compensation torque from excessively increasing due to change of the speed change ratio, thus preventing the occurrence of torque shock.

DESCRIPTION OF EMBODIMENTS

First Embodiment

The following describes the first embodiment in which a control apparatus according to the present invention is applied to a vehicle equipped with only a rotary electric machine that only serves as the main engine of the vehicle.

Figure 1:
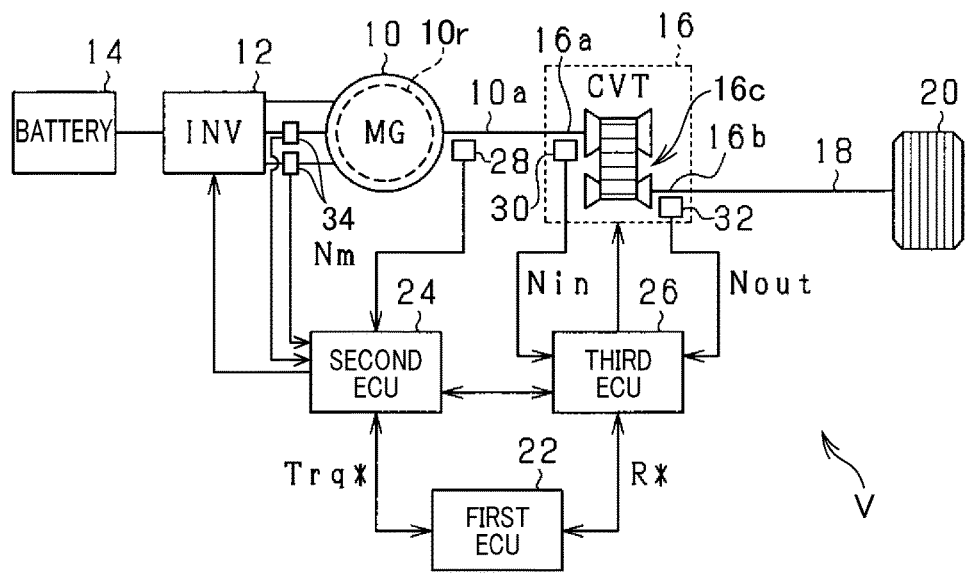
FIG. 1 is a diagram schematically illustrating an overall structure of a control system including a rotary electric machine according to the first embodiment of the present invention.

Referring to FIG. 1, the vehicle V includes a motor-generator (MG) 10, an inverter 12, a battery 14, a continuously variable transmission 16, a drive shaft 18, and driving wheels 20. The vehicle V also includes a first electronic control unit (ECU) 22, a second ECU 24, and a third ECU 26.

The motor-generator 10 functions as both a motor serving as a running drive source of the vehicle V and a power generator. The first embodiment uses a multiphase rotary electric machine, such as a three-phase rotary electric machine including three-phase windings (U-, V-, and W-phase windings). Specifically, the first embodiment uses, for example, a three-phase synchronous motor as the motor-generator 10.

A voltage-controlled three-phase inverter is used as the inverter 12 if the three-phase rotary electric machine is used as the motor-generator 10. The inverter 12 converts a direct-current (DC) voltage output from the battery 14 into an alternating-current (AC) voltage, and applies the AC voltage to the motor-generator 10. This voltage application causes the motor-generator 10 to operate as a motor. On the other hand, when receiving drive power transferred from the side of the drive shaft 18, the motor-generator 10 operates as a power generator in accordance with the drive power.

The motor-generator 10 includes a rotor 10r to which an output shaft 10a, referred to as a motor output shaft 10a, is coupled. An input shaft 16a, which corresponds to a first shaft, of the continuously variable transmission 16 is coupled to the motor output shaft 10a. The continuously variable transmission 16 is capable of continuously changing the ratio of the rotational speed of the input shaft 16a to the rotational speed of its output shaft 16b, which corresponds to a second shaft, while maintaining the power transfer state between the input shaft 16a and the output shaft 16b.

The driving wheels 20 are coupled to the output shaft 16b via the drive shaft 18. The motor output shaft 10a according to the first embodiment is configured to be rotated at the same rotational speed as the rotational speed of the input shaft 16a. Note that the first embodiment uses a hydraulic continuously variable transmission as the continuously variable transmission 16. That is, the continuously variable transmission 16 includes a hydraulic drive circuit 16c that controls the speed change ratio using hydraulic pressure. Note that the drivetrain according to the first embodiment includes the motor output shaft 10a, the continuously variable transmission 16, and the drive shaft 18. Each of the motor output shaft 10a, the input and output shafts 16a and 16b of the continuously variable transmission 16, and the drive shaft 18 corresponds to, for example, an example of rotating members that rotates as the motor-generator 10 rotates.

The vehicle V includes a first rotational speed sensor 28, a second rotational speed sensor 30, and a third rotational speed sensor 32. The first rotational speed sensor 28 corresponds to an example of speed detectors, and the third rotational speed sensor 32 corresponds to an example of downstream detectors. The first rotational speed sensor 28 measures the rotational speed, which will be referred to as a motor rotational speed, of the motor output shaft 10a, i.e. the rotor 10r. The second rotational speed sensor 30 measures the rotational speed, which will be referred to as an input rotational speed, of the input shaft 16a. The third rotational speed sensor 32 measures the rotational speed, which will be referred to as an output rotational speed, of the output shaft 16b. In the first embodiment, the measured values of the first rotational speed sensor 28 are input to the second ECU 24, and the rotational values of the respective second and third rotational speed sensors 30 and 32 are input to the third ECU 26. Note that the first embodiment can be configured such that a sensor for measuring the electrical rotational angle or the electrical rotational angular velocity of the rotor 10r of the motor-generator 10 can be installed in the vehicle V. At that time, for example, the second ECU 24 can calculate the motor rotational speed based on the electrical rotational angle or the electrical rotational angular velocity of the rotor 10r measured by the sensor.

The vehicle V also includes a current sensor 34. The current sensor 34 measures currents flowing through at least respective two phase windings. For example, the current sensor 34 according to the first embodiment measures V- and W-phase currents flowing through the respective V- and W-phase windings, and sends the measured V- and W-phase currents to the second ECU 24.

Each of the first, second, and third ECUs 22, 24, and 26 is configured as a microcomputer including a CPU, a ROM, a RAM, an I/O, and so on, and carries out various programs stored in, for example, the ROM. The first, second, and third ECUs 22, 24, and 26 are configured to communicate information with each other.

The first ECU 22 is a higher-order control unit than each of the second and third ECUs 24 and 26. That is, the first ECU 22 is an upstream control apparatus with respect to the second and third ECUs 24 and 26 in the flow of addressing vehicle's user requests. The first ECU 22 supervises overall control of the vehicle V. The first ECU 22 calculates target torque Trq* for the motor-generator 10 based on detection signals indicative of, for example, a user's operated, i.e. depressed, quantity of the accelerator pedal, and outputs the target torque Trq* to the second ECU 24.

The second ECU 24 serves as a control unit for controlling the motor-generator 10 as its control target. To the second ECU 24, the target torque Trq* is input from the first ECU 22, and the measured values of the second and third rotational speed sensors 30 and 32 are input from the third ECU 26. The second ECU 24 perform on-off control of switching elements, which are connected in, for example, bridge configuration, of the inverter 12, thus converting a DC voltage output from the battery 14 into controlled three-phase AC voltages. Then, the second ECU 24 applies the three-phase AC voltages to the respective three-phase windings, i.e. the U-, V-, and W-phase windings, of the motor-generator 10. This controls torque of the motor-generator 10, which turns the rotor 10r, to follow the target torque Trq*.

The third ECU 26 serves as a control apparatus for controlling the continuously variable transmission 16 as its control target. To the third ECU 26, a target speed change ratio R* is input from the first ECU 22. The third ECU 26 controls the hydraulic drive circuit 16c of the continuously variable transmission 16, thus adjusting the speed change ratio of the continuously variable transmission 16 to match with the input target speed change ratio R*.

Figure 2:
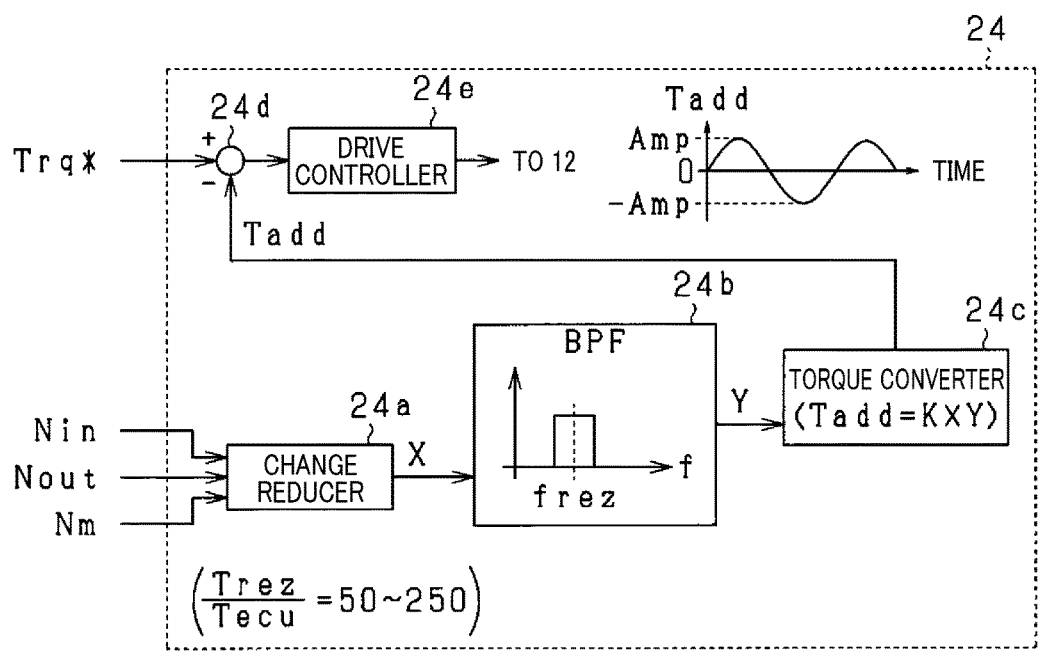
FIG. 2 is a block diagram illustrating an example of the structure of a second ECU illustrated in FIG. 1.

Next, the following describes an example of the structure of the second ECU 24 for performing torque control of the motor-generator 10 based on the target torque Trq* with reference to the block diagram of FIG. 2.

As illustrated in FIG. 2, the second ECU 24 includes a change reducer 24a, a filter processor 24b, a torque converter 24c, a corrector 24d, and a drive controller 24e.

These elements 24a to 24e can be implemented as hardware elements, software elements, and/or hardware-software hybrid elements.

The change reducer 24a, which serves as an example of a suppressor, receives the motor rotational speed Nm, input rotational speed NM, and output rotational speed Nout measured by the respective first, second, and third rotational speed sensors 28, 30, and 32. Then, the change reducer 24a performs, according to the motor rotational speed Nm, the input rotational speed NM, and the output rotational speed Nout, a rotational-speed change reduction task. The rotational-speed change reduction task will be described in detail later.

The filter processor 24b, which serves as an example of extractors, includes, for example, a bandpass filter. The bandpass filter has a predetermined passband including a resonant frequency frez of the drivetrain. For example, the predetermined pass band has the resonant frequency frez as a center frequency thereof.

The filter processor 24b receives a signal, which has been subjected to the rotational-speed change reduction task, output from the change reducer 24a; the signal represents the motor rotational speed Nm, and will be referred to as a processed rotational speed signal X hereinafter. Then, the filter processor 24b extracts vibration components, which are contained in the processed rotational speed signal X, from the processed rotational speed signal X as frequency signals Y; each of the frequency signals Y is defined as a frequency signal in a time domain.

These vibration components Y are contained in at least one of the output rotational speed Nout, the input rotational speed Nin, and the motor rotational speed Nm in association with resonance of the drivetrain, i.e. resonance of the drivetrain with respect to change of the motor rotational speed Nm. The resonance of the drivetrain can be expressed as a known torsional vibration model, more specifically as a known first harmonic drivetrain torsional vibration model.

Specifically, the torsional vibration model of the drivetrain is comprised of a model including the moment of inertia of the motor-generator 10 and the equivalent mass moment of inertia of the vehicle linked together via a torsional spring. For example, the first embodiment simulates that the vibration components Y include a sinusoidally fluctuating component that fluctuates at a frequency within the range from 2 to 10 Hz inclusive; the center of the range matches with the resonant frequency frez of the drivetrain. Note that the filter processor 24b according to the first embodiment performs, for example, a digital-filtering process to extract the vibration components Y.

The torque converter 24c, which corresponds to an example of compensation torque calculators, calculates, according to the vibration components, i.e. frequency signals, Y extracted by the filter processor 24b, compensation torque signals Tadd for counteracting resonance of the drivetrain. For example, the torque converter 24c according to the first embodiment multiplies the vibration components, i.e. frequency signals, Y by a multiplication coefficient K to thereby calculate the compensation torque signals Tadd.

The corrector 24d subtracts the compensation torque signals Tadd from the target torque Trq* to correct the target torque Trq*, thus obtaining final target torque Trqf* that is expressed by the following equation Trqf*=Trq*−Tadd. In the first embodiment, if the target torque Trq* is positive, the control mode of the inverter 12 by the second ECU 24 is set to a first control mode for causing the motor-generator 10 to serve as a motor. In contrast, if the target torque Trq* is negative, the control mode of the inverter 12 by the second ECU 24 is set to a second control mode for causing the motor-generator 10 to serve as a generator.

The drive controller 24e, which serves as an example of controllers, performs on-off control of the switching elements of the inverter 12 according to the final target torque Trqf* to convert the DC voltage output from the battery 14 into controlled three-phase AC voltages, thus applying the controlled three-phase AC voltages to the respective three-phase windings of the motor-generator 10. This causes torque of the motor-generator 10 to follow the final target torque Trqf*. The drive controller 24e can perform known current vector control as an example of the on-off control of the switching elements of the inverter 12.

For example, the current vector control calculates, from the measured V- and W-phase currents, the remaining phase current, i.e. the U-phase current. Then, the current vector control converts the three-phase currents (U-, V-, and W-phase currents) into a current value in a first axis and a current value in a second axis; the first and second axes define a rotating Cartesian coordinate system defined in the rotor 10r. The rotating Cartesian coordinate system rotates as the rotor 10r rotates.

Additionally the current vector control obtains a first deviation between the first-axis current value, i.e. the first axis measured current value, and a first-axis command current, and a second deviation between the second-axis current value, i.e. the second axis measured current value, and a second-axis command current. Then, the current vector control obtains three-phase AC command voltages that should zero the first and second deviations. The current vector control controls on-off operations of the switching elements of the inverter 12 according to the obtained three-phase command voltages, thus causing torque of the motor-generator 10 to follow the final target torque Trqf*.

Specifically, the elements 24a to 24e of the second ECU 24 constitute a vehicle feedback-control system that performs feedback control for torque of the motor-generator 10 for example every predetermined period Tecu.

In particular, the vehicle feedback-control system 24a to 24e carries out feedback control for torque of the motor-generator 10, so that vibration components, i.e. frequency signals, Y are measured by the elements 24a and 24b. The torque converter 24c multiplies the measured vibration components, i.e. frequency signals, Y by the multiplication coefficient K as a feedback gain to thereby calculate the compensation torque signals Tadd. The target torque Trq* is corrected based on the calculated compensation torque signals Tadd. According to the corrected target torque, i.e. the final target torque Treqf*, the feedback control is carried out, which causes actual torque of the motor-generator 10 to match with the final target torque Tree.

Note that calculation of the compensation torque signals Tadd is based on the fact that the drivetrain of the vehicle V is for example configured such that the difference in phase between the motor rotational speed Nm, which is defined by the structure of the drivetrain, and the final target torque is zero or should be zero. That is, multiplying, by the multiplication coefficient K, the vibration components, i.e. frequency signals, Y to thereby adjust the amplitudes of the vibration components Y calculates the compensation torque signals Tadd.

If there is a phase difference between the motor rotational speed Nm and the final target torque, for example, the drive controller 24e can correct the phases of the compensation torque signals Tadd to match the corrected phases of the compensation torque signals Tadd with the phase of the motor rotational speed Nm.

Each of the compensation torque signals Tadd calculated by the torque converter 24c has a waveform substantially matching with the waveform of a corresponding one of the vibration components, i.e. frequency signals, Y. For example, if the vibration components Y include a sinusoidally vibrating component, the compensation torque signals Tadd include a sinusoidal signal fluctuating while crossing zero (see FIG. 2). FIG. 2 shows the amplitude of the sinusoidal signal included in the compensation torque signals Tadd as reference character Amp.

A value of the multiplication coefficient, i.e. feedback gain, K can be previously determined according to the amplitude of torque based on vibrations of the drivetrain that should be reduced; the torque is estimated by experiments or another means.

The frequencies of the vibration components, i.e. frequency signals, Y may change depending on the operations of the drivetrain. From this viewpoint, the torque converter 24c can variably set the multiplication coefficient K according to the frequencies of the vibration components, i.e. the frequency signals, Y. For example, the torque converter 24c can have relational information, such as a map or equations, in which frequencies of the vibration components, i.e. frequency signals, Y correlate with corresponding values of the multiplication coefficient K. The torque converter 24c refers to the relational information using the frequencies of the vibration components Y as input data to read values of the multiplication coefficient K respectively corresponding to the input frequencies of the vibration components Y. Then, the torque converter 24e sets the read values as values of the multiplication coefficient K.

The corrector 24d subtracts the compensation torque signals Tadd from the target torque Trq*. Note that subtraction of the compensation torque signals Tadd from the target torque Trq* represents (1) Addition of negative compensation torque signals Tadd to the target torque Trq* if the compensation torque signals Tadd are positive (2) Addition of positive compensation torque signals Tadd to the target torque Trq* if the compensation torque signals Tadd are negative.

In other words, if torque based on the vibration components Y sinusoidally fluctuates, the corrector 24d can add, to the target torque Trq*, compensation torque signals Tadd whose phases are shifted by $\pi$ relative to the sinusoidally fluctuated torque. This can cause the negative and positive amplitudes of the compensation torque signals Tadd to cancel out the positive and negative amplitudes of the sinusoidally fluctuated torque based on the vibration components.

The first embodiment sets the period Tecu of the feedback control by the second ECU 24 to be within the range from several-tenth part to several-hundredth part of the periods, referred to as Trez, of the vibration components, i.e. frequency signals, Y. Specifically, the frequency of each of the vibration components Y is simulated to be within the range from 2 to 10 Hz inclusive. This simulates the period Trez of each of the vibration components Y to be within the range from 0.1 to 0.5 seconds inclusive. Thus, the period Tecu by the second ECU 24 is set to a value included in the range from $\frac{1}{50}$ to $\frac{1}{200}$ of the periods Trez of the vibration components Y inclusive, for example, set to 2 milliseconds.

The following describes the change reducer 24a, which is a specific component of the first embodiment.

The change reducer 24a performs a task to prevent the compensation torque signals Tadd from excessively increasing when the degree of change of the motor rotational speed Nm, i.e. the change rate or acceleration of the motor rotational speed Nm, is not set to zero, in other words, the motor rotational speed Nm changes from a constant speed.

For example, rapid change of the driver's operation of the accelerator pedal causes the speed change ratio of the continuously variable transmission 16 to rapidly change. Specifically, when the driver's operation of the accelerator pedal, which is located at a large accelerating state, such as a full accelerating state, is released, the speed change ratio of the continuously variable transmission 16 rapidly decreases.

The steep change of the speed change ratio causes the motor rotational speed Nm to steeply change. This results in vibration components based on the steep change of the motor rotational speed Nm being included in the motor rotational speed Nm; the vibration components vibrate at frequencies identical to frequency components of the drivetrain, which should be suppressed, i.e. the resonant frequency components of the drivetrain. In other words, a steep inclination of change of a base of the motor rotational speed Nm, on which the vibration components Y are superimposed, appears. This might result in the absolute levels of the amplitudes of the compensation torque signals Tadd for compensating resonance of the drivetrain excessively increasing in response to the steep inclination of change of the base of the motor rotational speed Nm although actual vibrations levels of the drivetrain are relatively small. This might cause the final target torque Trqf* to excessively increase, resulting in an increase of an actual output torque of the motor-generator 10. This might cause torque shock to the vehicle V.

The first embodiment aims to prevent the occurrence of such torque shock. Specifically, the change reducer 24a is configured to perform the rotational-speed change reduction task that reduces an amount ΔNcvt of change of the motor rotational speed Nm according to change of the speed change ratio from a total amount of change of the motor rotational speed Nm.

Figure 3:
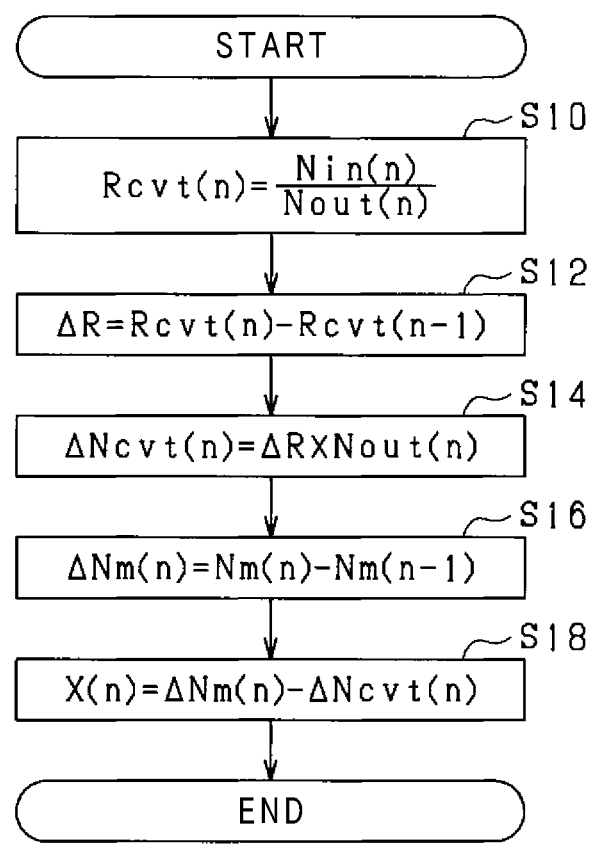
FIG. 3 is a flowchart schematically illustrating an example of a routine of a rotational-speed change reduction task according to the first embodiment.

FIG. 3 schematically illustrates a routine of the rotational-speed change reduction task. The second ECU 24, such as the change reducer 24a, performs the routine every predetermined period Tecu as an example.

According to the routine, the second ECU 24 calculates a speed change ratio Rcvt(n) in a current processing cycle n according to an input rotational speed Nin(n) and an output rotational speed Nout(n) measured in the current processing cycle n in step S10; n is a natural number equal to or more than 1.

Specifically, the second ECU 24 divides the input rotational speed Nin(n) in the current processing cycle n by the output rotational speed Nout(n) in the current processing cycle n, thus calculating the speed change ratio Rcvt(n) in the current processing cycle n. The reason for calculating the speed change ratio Rcvt(n) based on the input rotational speed Nin(n) in the current processing cycle n and the output rotational speed Nout(n) in the current processing cycle n is to accurately obtain an actual speed change ratio of the continuously variable transmission 16. Specifically, the second ECU 24 can use a target speed change ratio R* in the current processing cycle n as the speed change ratio Rcvt(n) in the current processing cycle n.

The continuously variable transmission 16 of the first embodiment is configured as a hydraulic device. For this reason, a time interval from which the target speed change ratio R* is input to the third ECU 26 to which the actual speed change ratio is controlled by the third ECU 26 to the target speed change ratio R* becomes relatively long. Thus, using the target speed change ratio R* in the current processing cycle n as the speed change ratio Rcvt(n) may cause a gap based on the time interval between the speed change ratio Rcvt(n) and the actual speed change ratio. In view of the circumstances, the second ECU 24 of the first embodiment calculates the speed change ratio Rcvt(n) in the current processing cycle n according to the input rotational speed Nin(n) and the output rotational speed Nout(n) in the current processing cycle n.

Note that each of the input rotational speed Nin(n) and the output rotational speed Nout(n) includes vibration components. The amplitudes and phases of the vibration components included in the input rotational speed Nin(n) are substantially identical to the amplitudes and phases of the vibration components included in the output rotational speed Nout(n). For this reason, dividing the input rotational speed Nin(n) by the output rotational speed Nout(n) causes the vibration components included in the input rotational speed Nin(n) and the vibration components included in the output rotational speed Nout(n) to cancel out each other. This cancellation makes it possible to suppress the vibration components contained in the speed change ratio Rcvt(n) in the current processing cycle n to negligible levels. Note that the operation in step S10 for example serves as an example of speed change ratio calculators in the first embodiment.

Next, the second ECU 24 subtracts a speed change ratio Rcvt(n−1) in a last previous processing cycle (n−1) from the speed change ratio Rcvt(n) in the current processing cycle n to thereby calculate a speed-change ratio change ΔR in the current processing cycle n in step S12. Note that the first processing cycle (n=1) sets the speed change ratio Rcvt(n−1) at the last previous processing cycle (n−1) to zero.

In step S14, the second ECU 24 calculates the product of the speed-change ratio change ΔR and the output rotational speed Nout(n) in the current processing cycle n as a changed amount ΔNcvt(n) of the motor rotational speed Nm associated with change of the speed change ratio in the current processing cycle n. The changed amount ΔNcvt(n) of the motor rotational speed Nm associated with change of the speed change ratio will also be referred to as a target change amount ΔNcvt(n) hereinafter. Note that the operation in step S14 for example serves as an example of target change amount calculators in the first embodiment.

Subsequently, the second ECU 24 subtracts a motor rotational speed Nm(n−1) in the last previous processing cycle (n−1) from the motor rotational speed Nm(n) in the current processing cycle n to thereby calculate a motor-rotation changed quantity ΔNm(n) in the current processing cycle n in step S16. The motor-rotation changed quantity ΔNm(n) corresponds to a time-dependent quantity. The operation in step S16 serves as, for example, an example of time-dependent quantity calculators. Note that the first processing cycle (n=1) sets the motor rotational speed Nm(n−1) in the last previous processing cycle (n−1) to zero.

Next, the second ECU 24 subtracts the target change amount ΔNcvt(n) in the current processing cycle n from the motor-rotation changed quantity ΔNm(n) in the current processing cycle n, thus calculating a processed rotational speed signal X(n) in the current processing cycle n in step S18. Thereafter, the second ECU 24 terminates the routine of the rotational-speed change reduction task.

The processed rotational speed signal X calculated for each predetermined period is input to the filtering processor 24*b*. At that time, no change amount of the motor rotational speed Nm associated with change of the speed change ratio is included in the processed rotational speed signal X calculated for each predetermined period.

This results in no vibration components due to change of the speed change ratio being contained in the vibration components Y extracted from the processed rotational speed signal X calculated for each predetermined period.

This therefore prevents, even if the speed change ratio is changed, the magnitudes of the compensation torque signals Tadd, i.e. the absolute levels of the amplitudes of the compensation torque signals Tadd, which are calculated based on the vibration components Y extracted from the processed rotational speed signal X, from excessively increasing due to change of the speed change ratio.

Note that the first embodiment sets the execution period of the sequence of the operations in steps S10 to S18, i.e. the predetermined period Tecu, to a value that enables the change ΔR of the speed change ratio Rcvt(n) in the current processing cycle n to be sufficiently reduced.

Specifically, the operation in step S10 of the routine illustrated in FIG. 3 divides the input rotational speed Nin(n) by the output rotational speed Nout(n), thus calculating the speed change ratio Rcvt(n) in the current processing cycle n. This calculation method is a calculation method based on the understanding that the output rotational speed Nout (n) of the output end 16*b* coupled to the driving wheels 20 is largely unchanged. For this reason, if a value of the period Tecu was set to a larger value, the speed change ratio Rcvt(n) calculated in step S10 might deviate from the actual speed change ratio. This might result in a larger deviation between the target change amount ΔNcvt(n) calculated in step S14 and the actual target change amount, making it difficult to sufficiently remove the effects of the target change amount from the motor-rotation changed quantity ΔNm(n).

Thus, the first embodiment determines the relationship between the period Trez of each of the vibration components Y and the period Tecu satisfying the following equation:

$$Trez/Tecu = A$$

Where A represents any values within the range from 50 to 250 inclusive.

Determining the period Tecu to any value within the range from, for example, a fiftieth part to a two hundredth part of the periods Trez of the vibration components Y, which are greatly less than the periods Trez, causes the effects of change of the speed change ratio on the target change amount ΔNcvt to be negligible levels. This sufficiently removes the effects of the target change amount from the motor-rotation changed quantity ΔNm(n).

Figure 4:
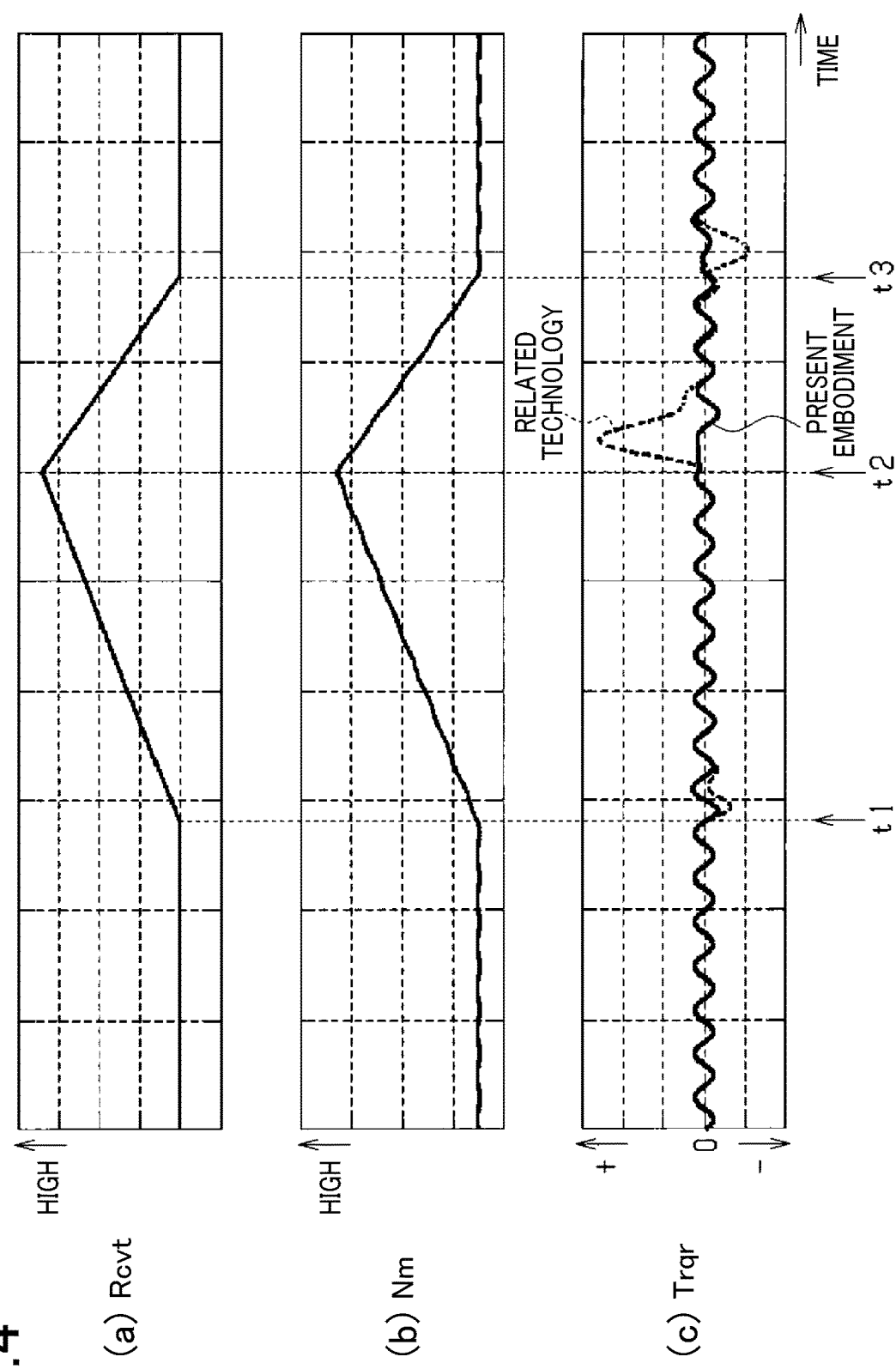
FIG. 4 is a graph illustrating how an actual speed change ratio changes over time, how a motor rotational speed changes over time, and how actual output torque changes over time according to the first embodiment.

FIG. 4 schematically illustrates an example of the execution result of the routine of the rotational-speed change reduction task.

In detail, reference character (a) in FIG. 4 illustrates an example of how the actual speed change ratio changes over time, and reference character (b) in FIG. 4 illustrates an example of how the motor rotational speed Nm changes over time. Reference character (c) in FIG. 4 illustrates an example of how the actual output torque Trqr according to the first embodiment changes over time. In the transition of the motor rotational speed Nm illustrated by reference character (b) in FIG. 4, the vibration components Y are not clearly illustrated due to scale. A dashed line in the reference character (c) in FIG. 4 represents an example of how the actual output torque Trqr according to a related technology changes over time; the related technology is configured such that the motor-rotation changed quantity ΔNm(n) is directly input to the filter processor 24b.

FIG. 4 demonstrates that, in the related technology, the output torque Trqr excessively increases immediately after each of times t1, t2, and t3 at which the speed change ratio rapidly changes due to the excessive increase of the compensation torque signals Tadd.

In contrast, the first embodiment prevents the compensation torque signals Tadd from excessively increasing even immediately after the speed change ratio rapidly changes, thus preventing the output torque Trqr from excessively increasing.

As described above, the first embodiment avoids the compensation torque signals Tadd from excessively increasing due to change of the speed change ratio, thus preventing the vehicle V from being subjected to torque shock.

Second Embodiment

The following describes the second embodiment while focusing on the different points of the second embodiment from the first embodiment with reference to the corresponding drawings.

Figure 5:
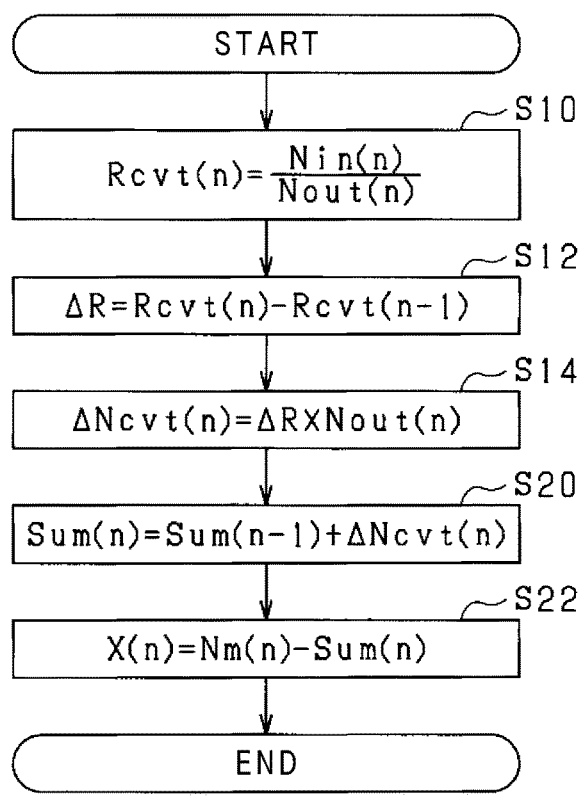
FIG. 5 is a flowchart schematically illustrating an example of a routine of a rotational-speed change reduction task according to the second embodiment of the present invention.

FIG. 5 schematically illustrates a routine of the rotational-speed change reduction task according to the second embodiment. The second ECU 24 performs the routine every predetermined period Tecu during, for example, the period from a user's instruction to start running of the vehicle V to a user's instruction to terminate running of the vehicle V. Note that like steps between the routine of the rotational-speed change reduction task illustrated in FIG. 5 and the routine of the rotational-speed change reduction task illustrated in FIG. 3, to which like step numbers are assigned, are omitted or simplified in description.

In the routine, after completion of the operation in step S14, the second ECU 24 adds the target change amount ΔNcvt(n) in the current processing cycle n to an integrated value Sum(n−1) of the target change amounts ΔNcvt from the timing to start running of the vehicle V to the last previous processing cycle (n−1) in step S20. This calculates an integrated value Sum(n) of the target change amounts ΔNcvt from the timing to start running of the vehicle V to the current processing cycle (n) in step S20. Note that the second embodiment sets an initial value Sum(0) of the integrated value of the target change amounts ΔNcvt to zero. The operation in step S20 in the second embodiment corresponds to an example of an integrator.

Next, the second ECU 24 subtracts the target changed quantity Sum(n) calculated in step S20 from the motor rotational speed Nm(n) obtained in the current processing cycle n, thus calculating a processed rotational speed signal X(n) in the current processing cycle n in step S22. Thereafter, the second ECU 24 terminates the routine of the rotational-speed change reduction task.

The processed rotational speed signal X calculated for each predetermined period is input to the filtering processor 24b. At that time, no change amount of the motor rotational speed Nm associated with change of the speed change ratio is included in the processed rotational speed signal X(n) from which the integrated value Sum(n) of the target change amounts has been subtracted.

This results in no vibration components due to change of the speed change ratio being contained in the vibration components Y extracted from the processed rotational speed signal X calculated for each predetermined period.

This therefore prevents, even if the speed change ratio is changed, the magnitudes of the compensation torque signals Tadd, i.e. the absolute levels of the amplitudes of the compensation torque signals Tadd, which are calculated by the torque converter 24c based on the vibration components Y extracted from the processed rotational speed signal X, from excessively increasing due to change of the speed change ratio.

Note that the second ECU 24 initializes the integrated value Sum(n) to zero when stop of running of the vehicle V is instructed.

Figure 6A:
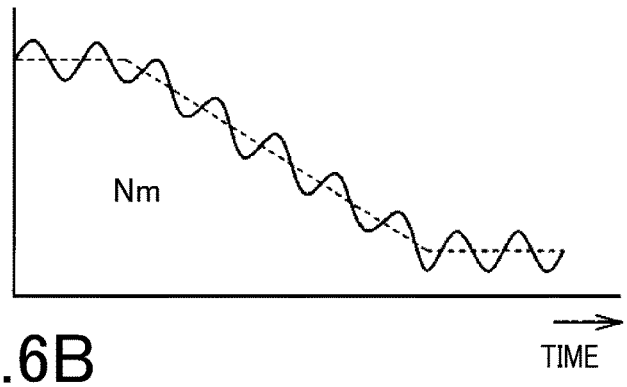
FIG. 6A is a graph schematically illustrating how the motor rotational speed, to which the rotational-speed change reduction task has not been applied, changes over time according to the second embodiment.
Figure 6B:
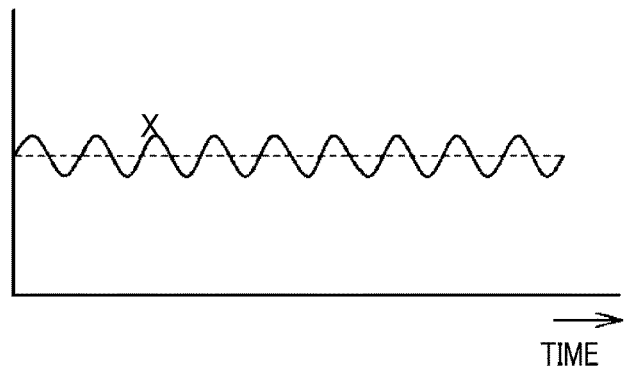
FIG. 6B is a graph schematically illustrating how a processed rotational speed signal, to which the rotational-speed change reduction task has been applied, changes over time according to the second embodiment.

FIG. 6 schematically illustrates an example of the execution result of the rotational-speed change reduction task under the situations where the speed change ratio is being changed. In detail, FIG. 6A illustrates how the motor rotational speed Nm, to which the rotational-speed change reduction task has not been applied, changes over time. FIG. 6B illustrates how the processed rotational speed signal Nm, to which the rotational-speed change reduction task has been applied, changes over time. Note that the dashed line in FIG. 6A represents the motor rotational speed Nm from which the vibration components Y have been eliminated, and the dashed line in FIG. 6B represents the processed rotational speed signal X from which the vibration components Y have been eliminated FIGS. 6A and 6B show that the second embodiment efficiently removes the change of the motor rotational speed Nm associated with change of the speed change ratio from the motor rotational speed Nm input to the filter processor 24b. Specifically, FIGS. 6A and 6B show that the steep inclination of change of the base of the motor rotational speed Nm, which is base of the vibration components Y, is efficiently removed from the motor rotational speed Nm input to the filter processor 24b. The second embodiment therefore achieves the same effects as those achieved by the first embodiment.

Other Embodiments

The first and second embodiments can be modified as follows.

The motor rotational speed Nm(n) can be used in place of the input rotational speed Nin(n) used in step S10 according to the first embodiment. The output rotational speed Nout (n) used in step S14 of FIG. 3 can be calculated based on the speed change ratio Rcvt(n) and the motor rotational speed Nm(n) according to the first embodiment. The input rotational speed Nin(n) can be used in place of the motor rotational speed Nm(n) used in step S16 of FIG. 3, or can be calculated by dividing the output rotational speed Nout(n) by the speed change ratio Rcvt(n).

The routine illustrated in FIG. 3 according to the first embodiment can eliminate the operation in step S10, and can use a target speed change ratio R*(n) in the current processing cycle n as substitute for the speed change ratio Rcvt(n) used in step S12.

Each embodiment is configured such that the filter processor 24b extracts vibration components, which are contained in the processed rotational speed signal X, from the processed rotational speed signal X as signals in a time domain. For example, the filter processor 24b can extract, from the processed rotational speed signal X in a frequency region extracted by a bandpass filter, the frequency whose corresponding amplitude level is the highest in the other amplitude levels as a vibration component Y. Specifically, the filter processor 24b can extract a vibration component contained in the processed rotation speed signal X from the processed rotation speed signal X as a signal in a frequency domain. In this modification, the torque converter 24c can set the amplitude Amp of the compensation torque signals Tadd as a function of the extracted frequency. In particular, the torque converter 24c can have relational information, such as a map or equations, in which frequencies of the vibration component, i.e. frequency signal, Y correlate with corresponding values of the amplitude Amp of the compensation torque signals Add. The torque converter 24c can refer to the relational information using the frequency of the vibration component Y as input data to read a value of the amplitude Amp of the compensation torque signals Add corresponding to the input frequency of the vibration component Y. Then, the torque converter 24e can set the read value as the value of the amplitude Amp of the compensation torque signals Add. In this modification, the phase of the compensation torque signals Add can be determined based on, for example, the phase of the motor rotational speed Nm.

Each embodiment uses a continuously variable transmission (a step-less transmission) 16 as an example of transmissions, but can use a stepped transmission. In this modification, changing the speed change ratio while the input and output shafts of the stepped transmission are coupled to each other causes vibration components, which vibrate at frequencies identical to the resonant frequency components of the drivetrain, to be included in the motor rotational speed Nm. For this reason, the present invention can be efficiently applied to this modification.

Each embodiment can be applied to various vehicles in each of which a clutch is provided between the motor output shaft 10a and the input shaft 16a of the continuously variable transmission 16. The present invention can be efficiently applied to this modification as long as the motor output shaft 10a and the input shaft 16a of the continuously variable transmission 16 are engaged with each other by the clutch. Vehicles, to each of which the present invention can be applied, include not only vehicles equipped with a rotary electric machine as a main engine, but also vehicles equipped with an internal combustion engine and a rotary electric machine.

REFERENCE SINGS LIST

10 Motor-generator
16 Continuously variable transmission
20 Driving wheel
24 Second ECU

The invention claimed is:

1. A control apparatus for a rotary electric machine that is applicable to a vehicle, the vehicle being equipped with a drivetrain that includes a transmission for transmitting power output from rotation of a rotating member of the rotary electric machine to a driving wheel according to a variable speed change ratio, the control apparatus comprising:
an extractor that extracts, based on a rotational speed of the rotating member, a vibration component included in the rotational speed of the rotating member, the vibration component being based on vibrations of the drivetrain;
a compensation torque calculator that calculates, according to the vibration component extracted by the extractor, compensation torque for compensating the vibrations of the drivetrain;
a controller that performs drive control of the rotary electric machine according to the compensation torque; and
a suppressor that:
calculates a changed quantity of the rotational speed of the rotating member that is associated with a change of the speed change ratio; and
determines the rotational speed of the rotating member that is subsequently used by the extractor, the rotational speed being determined based on the calculated changed quantity of the rotational speed that is associated with the change of the speed change ratio.

2. The control apparatus for a rotary electric machine according to claim 1, wherein:
the suppressor comprises:
a time-dependent quantity calculator that calculates a time-dependent quantity in accordance with the rotational speed of the rotating member, the time-dependent quantity representing the changed quantity of the rotational speed of the rotating member during a predetermined time; and
a target change amount calculator that calculates a target change amount in accordance with the rotational speed, the target change amount representing a changed amount of the rotational speed associated with the change of the speed change ratio during the predetermined time,
the suppressor being configured to perform a task of subtracting the target change amount from the time-dependent quantity; and
the extractor extracts the vibration component using a value of the time-dependent quantity from which the target change amount has been subtracted.

3. The control apparatus for a rotary electric machine according to claim 1, wherein:
the suppressor comprises:
a target change amount calculator that calculates a target change amount in accordance with the rotational speed, the target change amount representing a changed amount of the rotational speed associated with the change of the speed change ratio during a predetermined time,
the suppressor being configured to perform a task of subtracting the target change amount from the changed quantity of the rotational speed of the rotating member that is associated with the change of the speed change ratio to thereby obtain a processed rotational speed; and
the extractor extracts the vibration component using the processed rotational speed obtained by the suppressor.

4. The control apparatus for a rotary electric machine according to claim 3, wherein:
the rotational speed of the rotational member is cyclically measured, and the target change amount calculator of the suppressor is configured to cyclically calculate values of the target change amount in accordance with the cyclically measured values of the rotational speed;
the suppressor comprises an integrator that adds a value of the target change amount calculated by the target change amount calculator for each cycle to a value of the target change amount calculated in a previous cycle, thus calculating an integrated value for each cycle,
the suppressor being configured to perform a task of subtracting, from the value of the rotational speed calculated for each cycle, the integrated value calculated by the integrator for the corresponding cycle; and the extractor extracts the vibration component in accordance with the value of the rotational speed calculated for each cycle from which the integrated value has been subtracted.

5. The control apparatus for a rotary electric machine according to claim 2, wherein:
the rotational member is an output shaft of the rotary electric machine;
the transmission comprises a first shaft coupled to the output shaft, and a second shaft coupled to the driving wheel; and
the target change calculator comprises a speed change ratio calculator that calculates a change of the speed change ratio during the predetermined time, the target change calculator multiplying, by the change of the speed change ratio, a rotational speed of the second shaft, thus calculating the target change amount.

6. The control apparatus for a rotary electric machine according to claim 2, wherein:
the predetermined time is set to enable an effect of change of the speed change ratio on the target change amount to be a negligible level.

7. The control apparatus for a rotary electric machine according to claim 1, wherein:
the extractor comprises a bandpass filter to which a signal indicative of the rotational speed of the rotating member output from the suppressor is input as an input signal, the bandpass filter having a passband including a resonant frequency of the drivetrain,
the extractor extracting, from the input signal, a signal component passing through the bandpass filter as the vibration component.

8. The control apparatus for a rotary electric machine according to claim 1, wherein:
the transmission is a continuously variable transmission capable of continuously changing the speed change ratio while maintaining power being transferrable between the rotary electric machine and the driving wheel.

9. The control apparatus for a rotary electric machine according to claim 1, wherein:
the suppressor comprises:
a target change amount calculator that calculates a target change amount in accordance with the rotational speed, the target change amount representing a changed amount of the rotational speed associated with the change of the speed change ratio during a predetermined time,
the suppressor being configured to perform, as the suppression, a task of subtracting an integrated sum of the target change amount from the rotational speed of the rotating member to thereby obtain a processed rotational speed; and
the extractor extracts the vibration component using the processed rotational speed obtained by the suppressor.

10. A control apparatus for a rotary electric machine that is applicable to a vehicle, the vehicle being equipped with a drivetrain that includes a transmission for transmitting power output from rotation of a rotating member of the rotary electric machine to a driving wheel according to a variable speed change ratio, the control apparatus comprising:
a suppressor configured to receive an input rotational speed input to the transmission based on the rotation of the rotating member, and an output rotational speed output from the transmission; and perform:
a first calculation task that calculates, based on a change of a ratio of the input rotational speed to the output rotational speed, a changed quantity included in a current value of the rotational speed of the rotating member, the changed quantity being due to the change of the speed change ratio; and
a second calculation task that subtracts, from the current value of the rotational speed of the rotating member, the changed quantity calculated by the first calculation task to thereby calculate a processed rotational speed signal from which the changed quantity has been removed;
an extractor that receives the processed rotational speed signal, and extracts, based on the processed rotational speed signal, a vibration component included in the processed rotational speed signal;
a compensation torque calculator that calculates, according to the vibration component extracted by the extractor, compensation torque for compensating vibrations of the drivetrain; and
a controller that performs drive control of the rotary electric machine according to the compensation torque.

* * * * *